United States Patent [19]

Kamiya et al.

[11] Patent Number: 5,001,690
[45] Date of Patent: Mar. 19, 1991

[54] TILT SERVO CIRCUIT FOR AN OPTICAL DISC PLAYBACK DEVICE

[75] Inventors: Shingo Kamiya; Hiroyoshi Takanashi, both of Hamamatsu, Japan

[73] Assignee: Yamaha Corporation, Hamamatsu, Japan

[21] Appl. No.: 305,455

[22] Filed: Feb. 1, 1989

[30] Foreign Application Priority Data

Feb. 3, 1988 [JP] Japan ................................. 63-23592

[51] Int. Cl.[5] .............................................. G11B 7/00
[52] U.S. Cl. ................................................. 369/44.32
[58] Field of Search ............... 369/44.32, 44.33, 44.41, 369/44.35, 44.36, 112

[56] References Cited

U.S. PATENT DOCUMENTS 4,689,779 8/1987 Hayashi et al. ................... 369/44.32
4,703,468 10/1987 Baba et al. ........................ 369/44.32

Primary Examiner—Donald McElheny, Jr.
Attorney, Agent, or Firm—Spensley Horn Jubas & Lubitz

[57] ABSTRACT

A tilt servo circuit for controlling an optical axis of an optical pickup perpendicularly to the surface of an optical disc such as a Laser Vision Disc or a Compact Disc playbed back by an optical disc playback device comprises a RF level detection circuit for detecting level of an RF reproduced signal from an optical pickup, a tilt changing circuit for changing a tilt angle of the optical pickup, and a tilt servo control circuit for controlling the tilt changing circuit so as to bring the RF level to maximum or substantially maximum. The level of the RF reproduced signal varies with inclination of laser beam with respect to the perpendicular direction to the disc surface, namely the RF level is at the maximum when the inclination is zero and it decreases as the inclination increases. By detecting the RF level and controlling the tilt changing circuit in a manner to bring the RF level to the maximum, the inclination of the optical axis of the laser beam can be corrected.

3 Claims, 11 Drawing Sheets

TILT SERVO CIRCUIT FOR AN OPTICAL DISC PLAYBACK DEVICE

BACKGROUND OF THE INVENTION

This invention relates to a tilt servo circuit for controlling an optical axis of an optical pickup perpendicularly to the surface of an optical disc such as a Laser Vison Disc (LV) or a Compact Disc (CD) played back by an optical disc playback device and, more particularly, to such tilt servo circuit capable of detecting inclination of the disc surface without provision of a tilt sensor.

An optical disc playback device for a LV or CD is so designed that an optical axis of an optical pickup is maintained perpendicular to the normal disc surface. There however actually occur an upward warp 10' or a downward warp 10" with respect to the normal disc surface as shown in FIG. 2 due to heat and gravity. If optical axis 1 of an optical pickup 12 is disposed upwardly in a fixed manner with respect to a disc 10" having a large downward warp as shown in FIG. 3, vertical displacement of the disc surface occurring as the optical pickup 12 slides in a radial direction can be absorbed by focus servo at positions ⓐ and ⓑ to focus laser beam 14 on the disc record surface. At position ⓒ in the vicinity of outer periphery of the disc, however, the amount of vertical displacement of the disc surface can no longer be absorbed by focus servo with a result that laser beam 14 cannot be focused accurately on the disc record surface so that a signal cannot be reproduced. A disc 10' having a large upward warp has the same problem.

Further, when the laser beam 14 is perpendicular to the disc 10 as shown in FIG. 6, the optical axis 1 of the laser beam 14 makes a straight advance through a cover glass 16 and is focused on the record surface 18. In this case, distribution of intensity of the laser spot is shown in FIG. 7. In this figure, intensity of primary interference rings occurring in the vicinity of tracks T−1 and T+1 adjacent to a target track To is relatively small and the intensity in an outer peripheral side portion a and the intensity in an inner peripheral side portion b are equal to each other. If, however, the disc 10 is warped to incline with respect to the optical axis 1 as shown in FIG. 8, the laser beam 14 is refracted and thereby is caused to have aberration. This causes the intensity of the primary interference ring in the outer peripheral side portion a to become stronger as shown in FIG. 9 with a result that a signal on the adjacent track T+1 leaks in a larger amount than a signal on the adjacent track T−1.

Such crosstalk brings about so-called "ghost" in a reproduced picture in a video disc and increases jitter and error rate in a Compact Disc.

Such inclination of the laser beam with respect to the perpendicular direction to the disc surface occurs not only when there is warp in the disc but also when there is inclination in a turntable or when there is an optical axis angle error during manufacturing of the optical pickup.

For coping with this problem, there is a prior art tilt control device for controlling the angle of the optical pickup so as to maintain the optical axis of the laser beam constantly perpendicularly to the disc surface. According to this tilt control, as shown in FIG. 4, a guide shaft 20 along which the optical pickup 12 slides in radial direction is pivoted about a pivot 22 in a plane which passes through the center of the disc 10 and is perpendicular to the surface of the disc 10. There is another type of prior art tilt control device according to which, as shown in FIG. 5, a head base 24 which slides along a guide shaft 20 comprises a subbase 26 on which the optical pickup 12 is mounted and this subbase 26 is povoted about a pivot 28 in a plane which passes through the center of the disc 10 and is perpendicular to the surface of the disc 10.

In performing tilt control by such prior art devices, as shown in FIG. 10 for example, the subbase 26 is supported on the support 30 in a head base (not shown) slidable along a guide shaft in such a manner that the subbase 26 is pivotable about the pivot 28. A tilt sensor 32 is provided in the vicinity of the optical pickup 12 on the subbase 26 for detecting inclination of the optical axis of laser beam with respect to the perpendicular direction to the disc surface.

The tilt sensor 32 comprises a light emitting element 34 and ligth receiving elements 36 and 38. Light emitted from the light emitting element 34 is reflected on the disc surface and received by the light receiving elements 36 and 38. If there is no inclination (tilt error) of the optical axis 1 of the laser beam with respect to the perpendicular direction to the disc surface, the reflected light is received in the equal amount by the light receiving elements 36 and 38 whereas if there is inclination, the reflected light is received in a larger amount by one of the light receiving elements than by the other. Accordingly, by applying a difference voltage between the outputs of these light receiving elements 36 and 38 to a tilt control motor or the like device to control the pivoting angle of the subbase 26, tilt control is effected and the inclination of the optical axis 1 of laser beam thereby is corrected.

The prior art tilt control devices require the tilt sensor 32 provided exclusively for detecting tilt error which brings about increase in the manufacturing cost. Besides, angle of mounting of the light emitting element 34 of the tilt sensor 32 must be adjusted accurately so that the optical axis of the light emitting element 34 becomes parallel to the optical axis 1 of laser beam of the optical pickup 12 and adjustment of offset voltage due to irregularity in characteristics of the light receiving elements 36 and 38 becomes necessary. The adjustment of the tilt sensor 32 therefore is troublesome and time-consuming. Since, further, there is some difference between position of radiation by the tilt sensor 32 and position of radiation by the optical pickup 12, an error remains due to existence of a border with a mirror portion on the disc surface, scratch or warp on the disc surface and this remaining error causes an unnecessary tilt operation with resulting adverse effect on the subsequent reproduction of a signal from the disc.

It is, therefore, an object of the invention to provide a tilt servo circuit which obviates the tilt sensor which has been used exclusively for tilt control in the prior art tilt control devices.

SUMMARY OF THE INVENTION

For achieving the above described object, the tilt servo circuit according to the invention is characterized in that it comipses RF level detection means for detecting level of an RF reproduced signal from an optical pickup, tilt changing means for changing a tilt angle of the optical pickup, and tilt servo control means responsive to the output of the RF level detection means for controlling the tilt changing means so as to bring the RF level to maximum or substantially maximum.

The level of an RF reproduced signal from the optical pickup varies, as shown in FIG. 11, with the inclination of the laser beam with respect to the perpendicular direction to the disc surface. When the inclination is "0", the RF level is at the maximum and the RF level decreases as the inclination increases. Therefore, by detecting the RF level and controlling the tilt changing means in a manner to bring the RF level to the maximum or substantially maximum, the inclination of the optical axis of the laser beam can be corrected.

According to the invention, a tilt sensor becomes unnecessary so that the circuit design is simplified. Besides, the adjustment of the optical axis with the laser beam of the optical pickup and the adjustment of offset voltage become unnecessary and the problem of the remaining error is eliminated.

Embodiments of the tilt servo circuit will now be described with reference to the accompanying drawings.

BRIEF DESCRIPTION OF THE DRAWINGS

In the accompanying drawings.

DESCRIPTION OF THE PREFERRED EMBODIMENTS

Figure 1:
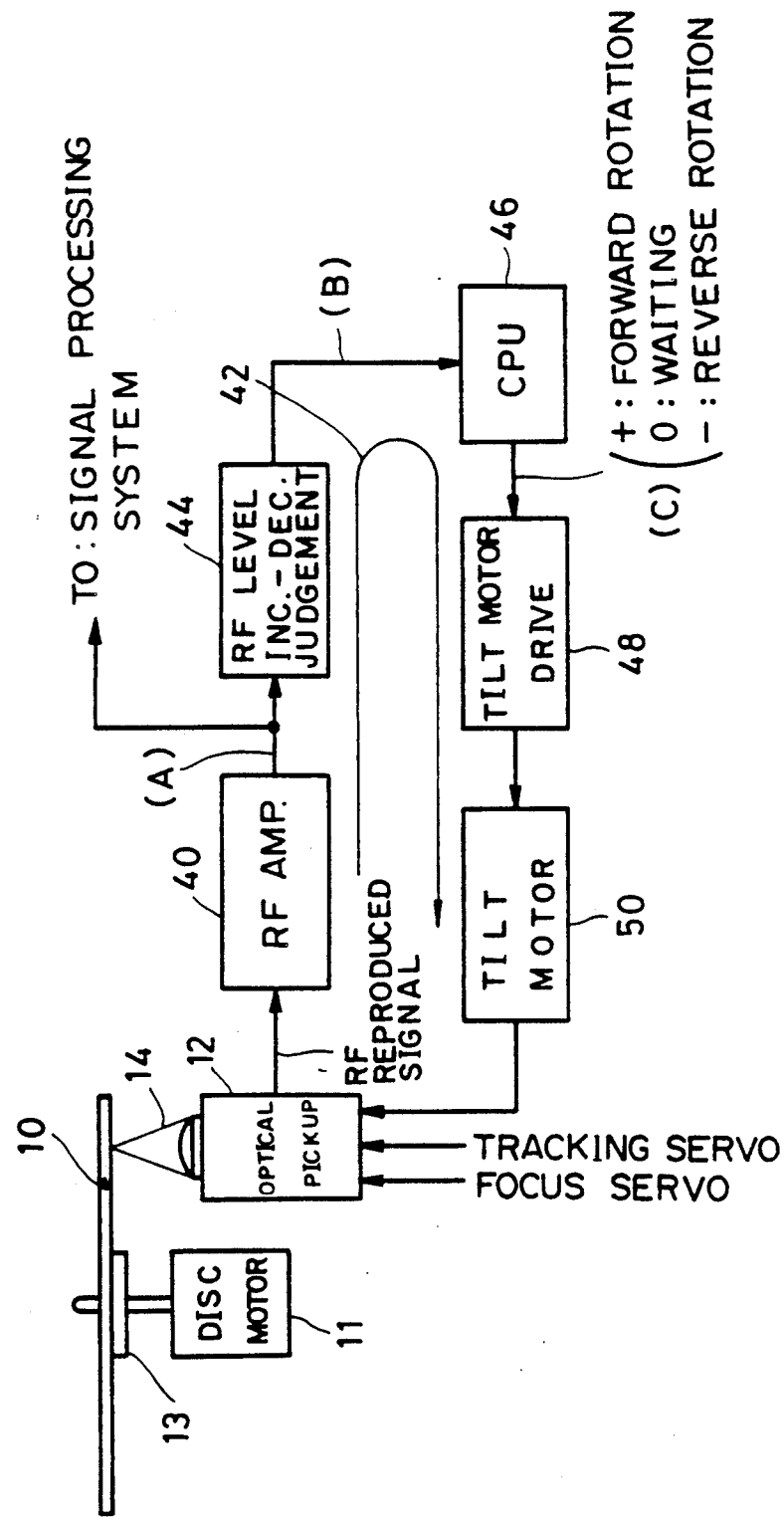
FIG. 1 is a block diagram showing an embodiment of the tilt servo circuit according to the invention.
Figure 2:
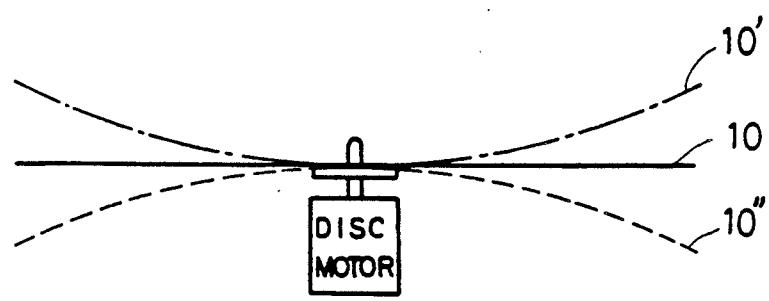
FIG. 2 is a side view showing a warp of a disc.
Figure 3:
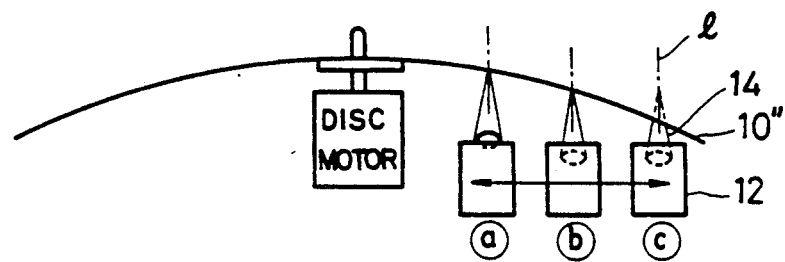
FIG. 3 is a side view showing a state in which the optical pickup slides with respect to a disc having warp.

Referring now to FIG. 1, a preferred embodiment of the invention will be described.

A disc 10 is mounted on a turn table 13 and which is driven and rotated by a disc motor 11. Laser beam 14 emitted by an optical pickup 12 is irradiated on the record surface of the disc 10 and the reflected laser beam is received by the light receiving element in the optical pickup 12. Focus servo and tracking servo of the optical pickup 12 are made in accordance with a received beam signal. The received beam signal is supplied as an RF reproduced signal to a signal processing system through an RF amplifier 40 and is subjected to a signal processing.

The RF reproduced signal is supplied also to a tilt servo circuit 42. In this tilt servo circuit, tilt driving is made periodically in either direction by a predetermined amount. The direction of driving is determined depending upon preceding driving direction and whether RF level has increased or decreased as a result of the preceding drive. If the RF level has increased as a result of the preceding drive, it means that the driving has been made in a direction in which the tilt error decreases and, accordingly, driving is made in the same direction next time. If the RF level has decreased as a result of the preceding drive, it means that the driving has been made in a direction in which the tilt error increases and, accordingly, driving is made in opposite direction next time. In this manner, the tilt driving is made always in a direction in which the RF level tends to become maximum.

In the tilt servo circuit 42, an RF level increase-decrease judgement circuit 44 periodically judges whether the RF level has increased or decreased. A CPU 46 determines the driving direction of the tilt control at each judgement of the circuit 44 and outputs a drive signal. This drive signal is applied through a tilt motor control circuit 48 to a tilt motor 50 to drive this motor 50 and thereby tilt-controls the optical pickup 12.

Figure 4:
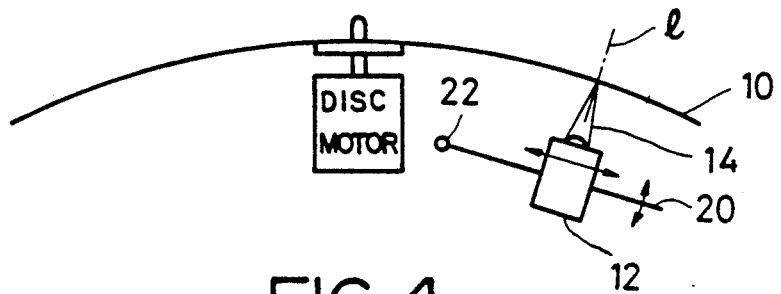
FIGS. 4 and 5 are side views showing the tilt control.
Figure 5:
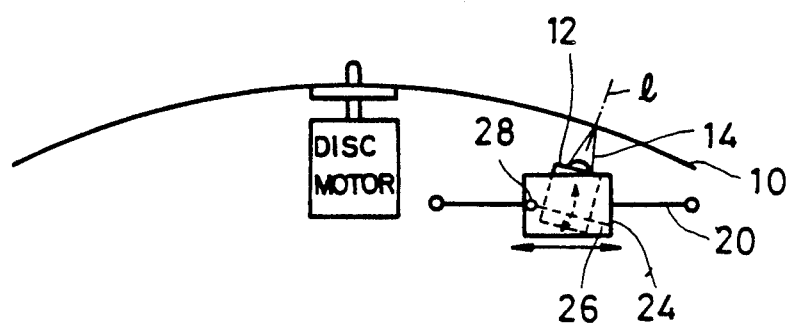
Figure 6:
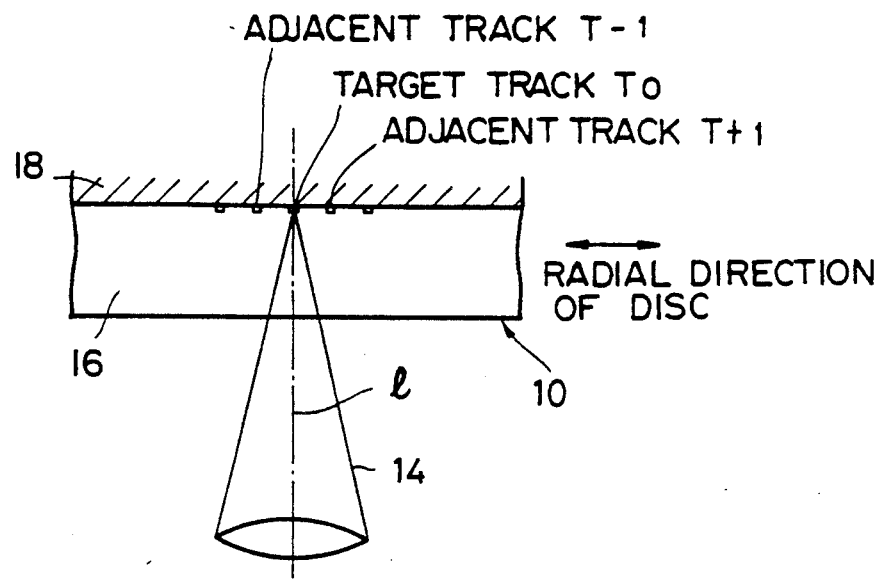
FIG. 6 is a diagram showing state of laser beam irradiated perpendicularly to the disc surface.
Figure 7:
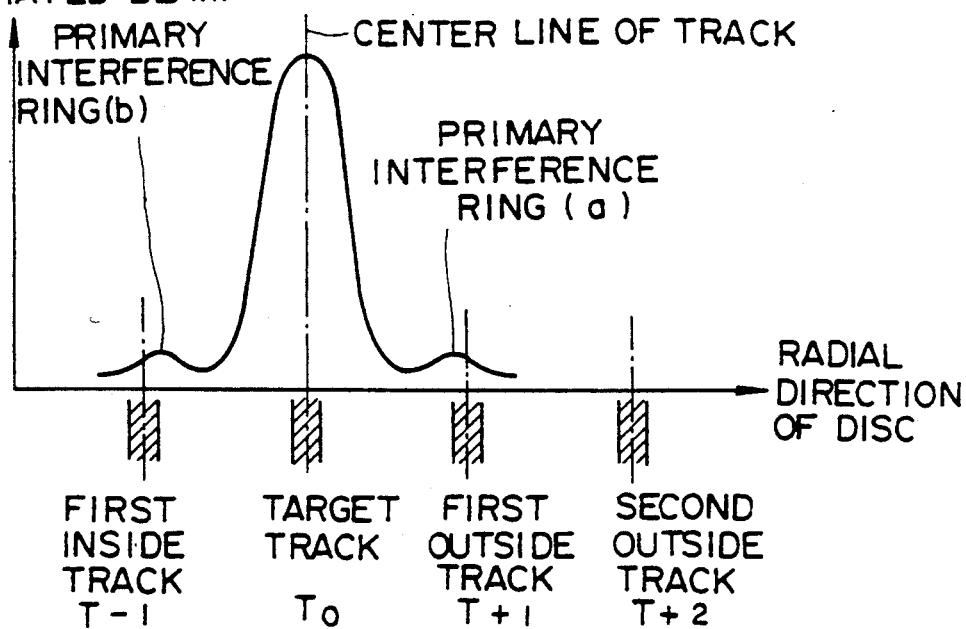
FIG. 7 is a diagram showning energy distribution of irradiated laser beam in the state of FIG. 6.
Figure 8:
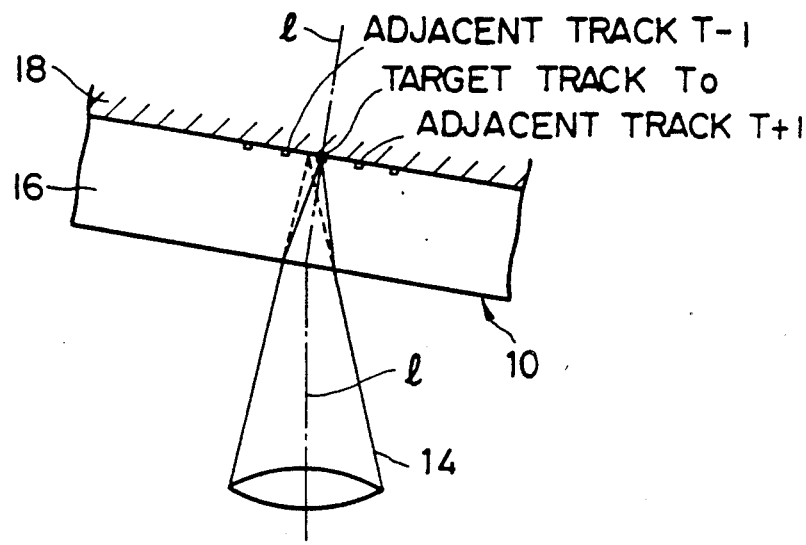
FIG. 8 is a diagram showing state of laser beam in the case where the disc surface is inclined.
Figure 9:
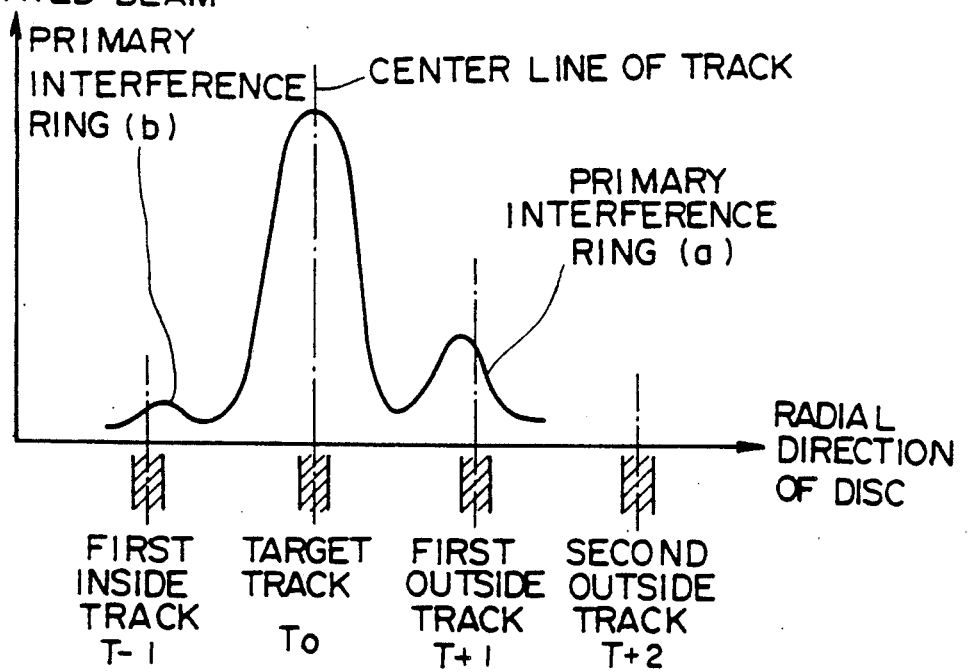
FIG. 9 is a diagram showing energy distribution of irradiated laser beam in the state of FIG. 8.
Figure 10:
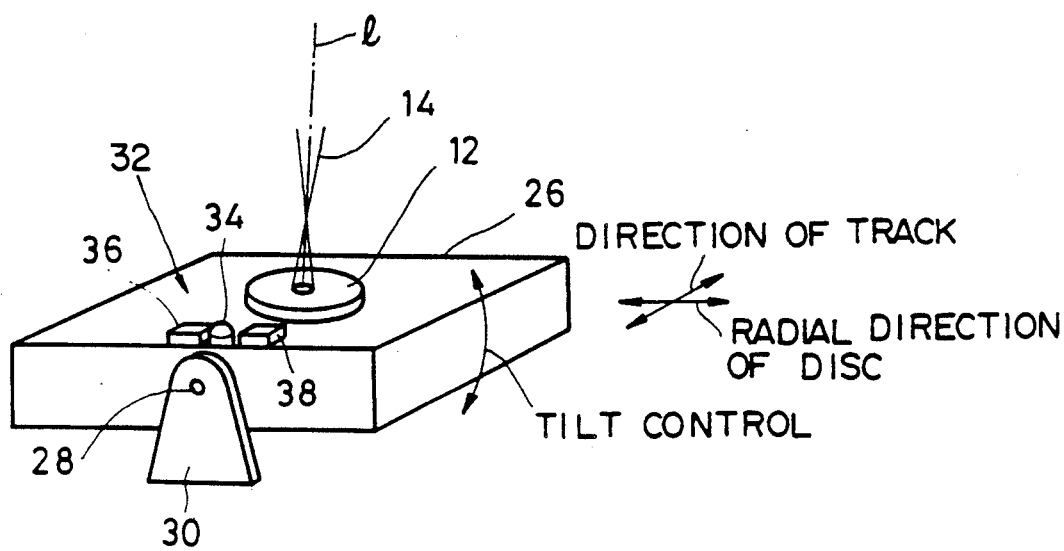
FIG. 10 is a perspective view of the tilt sensor used in the prior art tilt control devices.
Figure 11:
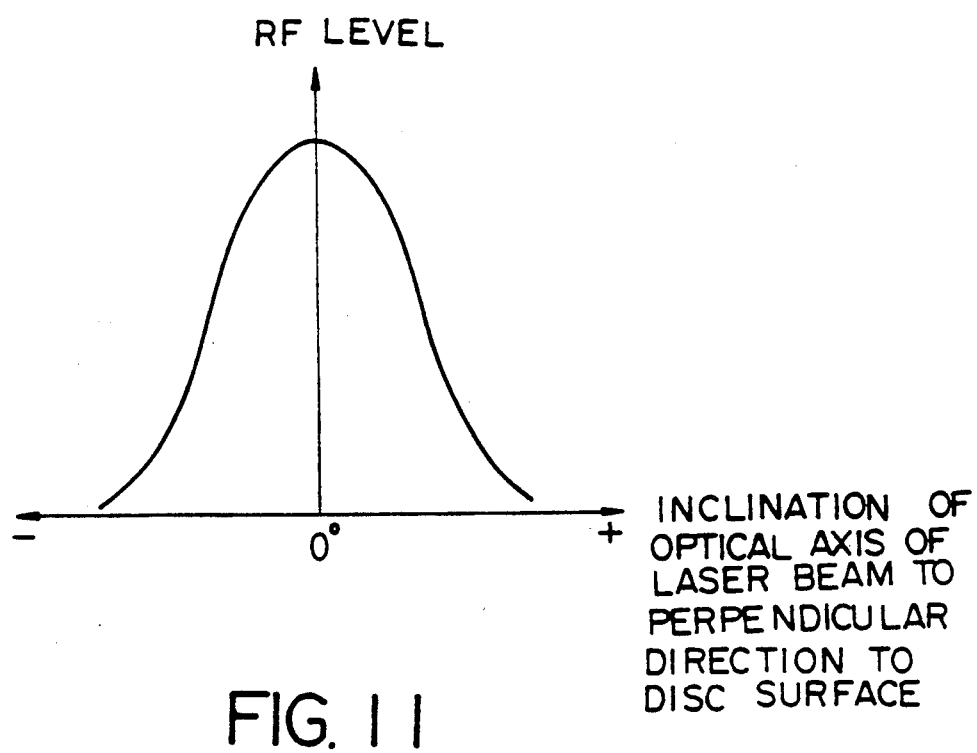
FIG. 11 is a characteristic diagram showing the variation of the RF level with respect to the inclination of the optical axis of laser beam.
Figure 12:
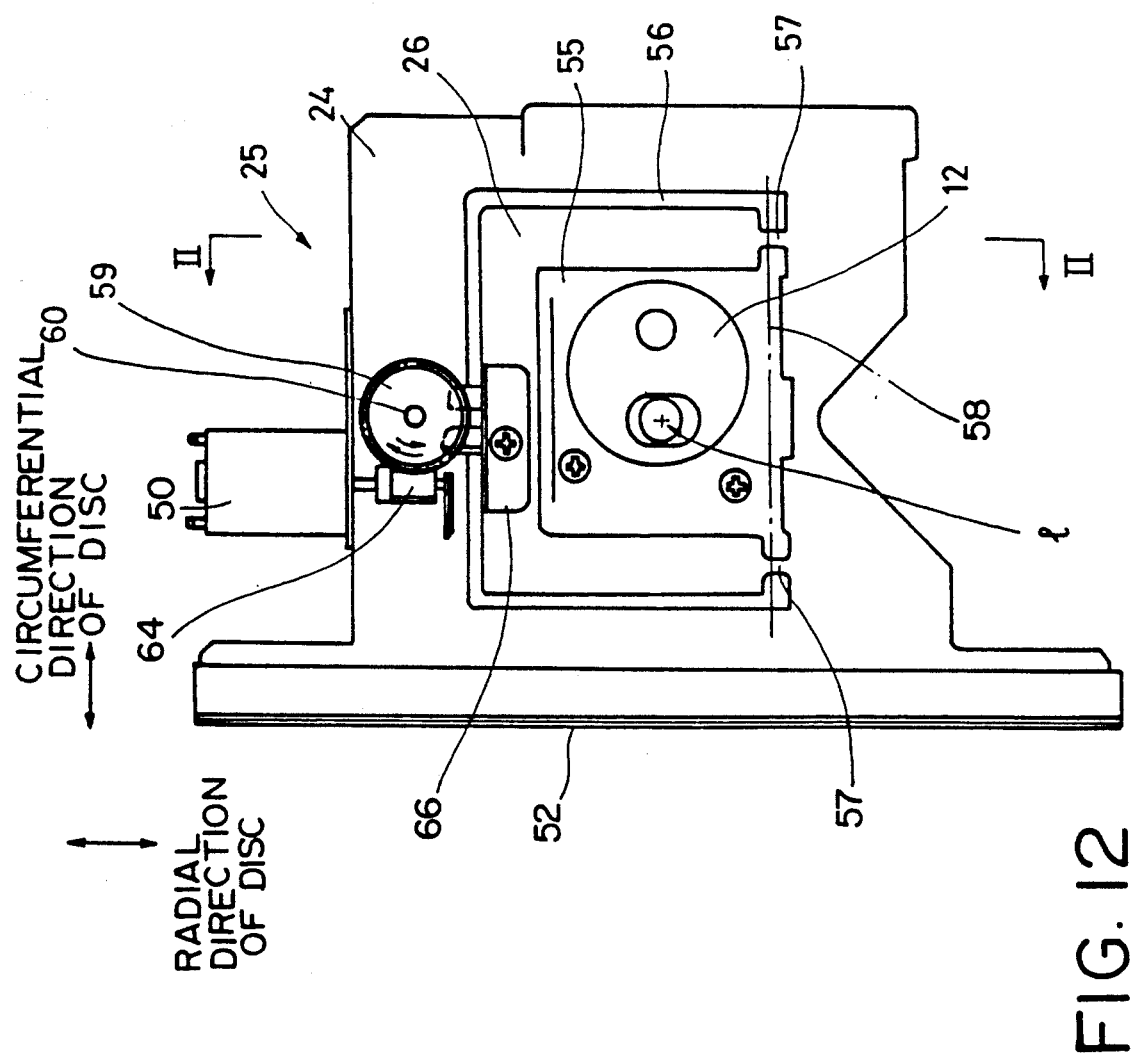
FIGS. 12 and 13 are plan view and side view of an example of tilt mechanism used for the optical pickup shown in FIG. 1.

As the tilt mechanism of the optical pickup 12, various types of mechanisms may be employed including the one shown in FIG. 4 in which the guide bar 20 itself is pivoted and the one shown in FIG. 5 in which the subbase 26 is pivoted. A specific example of the tilt mechanism of the type according to which the subbase is pivoted is shown in FIG. 12 (plan view) and FIG. 13 (side view).

A base 25 of this tilt mechanism comprises a head base 24 and a subbase 26 provided in the head base 24 and the optical pickup 12 is supported on the subbase 26.

The head base 24 is moved in radial direction of the disc, being guided along a guide bar (not shown) disposed in radial direction of the disc.

A rack 52 is provided on one side of the head base 24 and integrally with the head base 24 by outsert forming. The rack 52 is in mesh with a pinion (not shown) in a manner to reciprocate in the radial direction of the disc.

The subbase 26 provided on this head base 24 is constituted, as shown in FIG. 12, by a land portion which is formed, by stamping or the like technique, by forming a substantially rectangular opening 55 in the center of the head base 24 made of an elastic steel plate and a U-shaped slit 56 in a portion outside of the opening 55 with a certain distance therebetween, said slit 56 opening in the center side in the radial direction of the disc. The subbase 26 is flexible in a perpendicular direction to the radial direction of the disc at two connecting portions 57 with the head base 24 about a phantom line 58 which is parallel with the disc whereby the subbase 26 is slightly pivotable with respect to the head base 24.

This slight pivoting of the subbase 26 with respect to the head base 24 constitutes a tilting range of the optical pickup 12.

Figure 13:
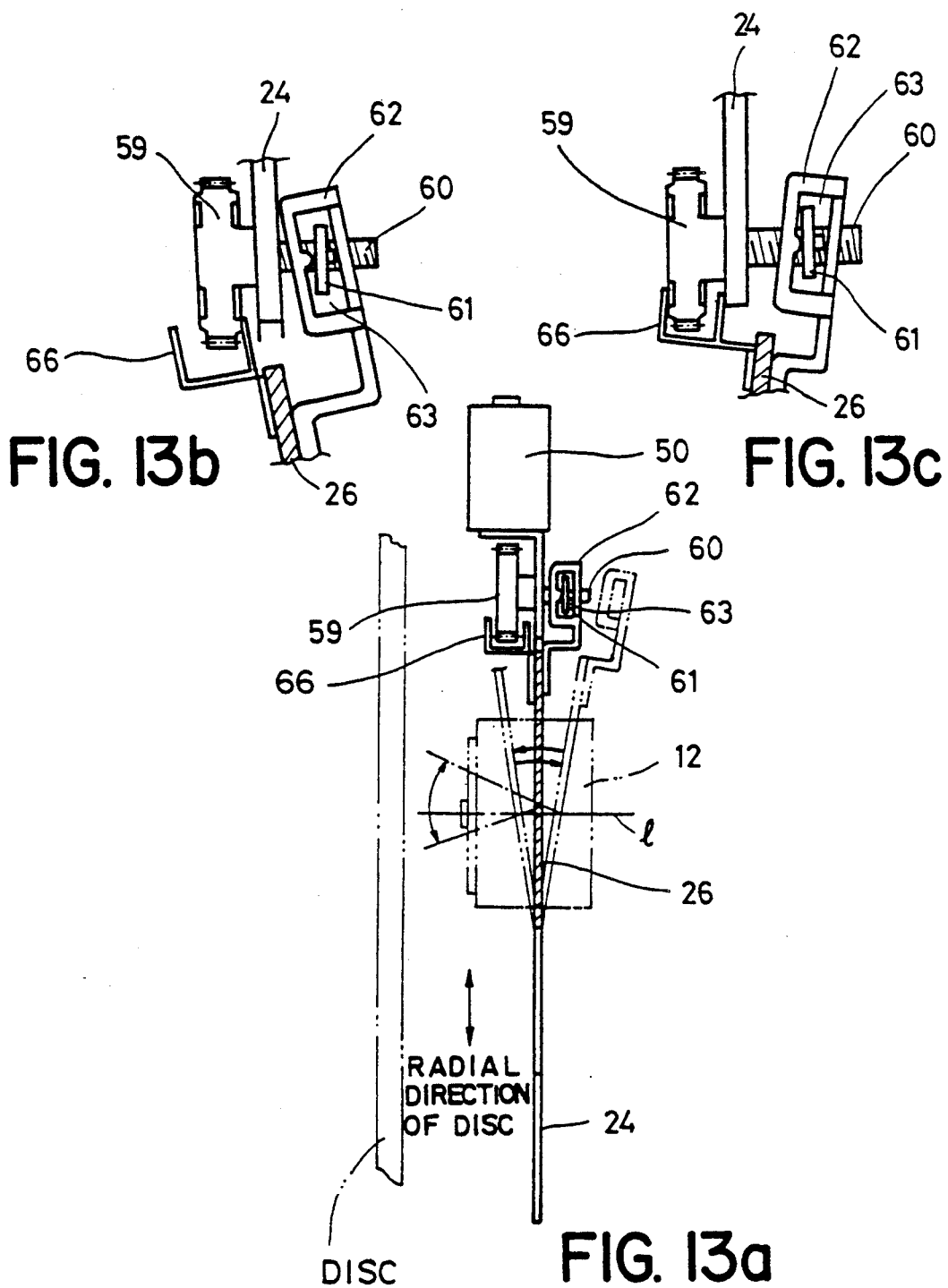

For performing this slight pivoting (tilt) of the subbase 26 automatically, as shown in FIGS. 12 and 13, a screw shaft 60 mounted with a worm wheel 59 is rotatably supported on the head base 24 with its screw portion projecting downwardly of the head base 24.

On a portion of the subbase 26 corresponding to the screw shaft 60 is mounted a laterally projecting tilt chassis 62. This tilt chassis 62 is formed with an engaging opening 63.

A nut plate 61 which is in threading engagement with the screw shaft 60 is engaged in the engaging opening 63 in such a manner that the nut plate 61 can incline at its both end portions in this engaging opening 63 and yet force in the axial direction of the screw shaft 60 can be transmitted.

A worm 64 which is in mesh with the worm wheel 59 at the upper end portion of the screw shaft 60 is driven by a tilt motor 50.

As the tilt motor 50 is driven, the screw shaft 60 is rotated through the worm 64 and the worm wheel 59 and the nut plate 61 is moved in reciprocating motion with the tilt chassis which is integral with the subbase 26 being inclined. At this time, as shown in enlarged views of FIG. 13, the nut plate 61 can relatively incline in the engaging opening 63 of the tilt chassis 62 and, accordingly, adjustment of optical axis 1 can be effected smoothly through the subbase 26.

A stop 66 formed with a projecting portion opposing a side surface of the worm wheel 59 is mounted at an end portion of the subbase 26. As shown in the enlarged views of FIG. 13, the stop 66 functions as a brake for stopping rotation of the worm wheel 59 by engaging the side surface of the worm wheel 59 and also mechanically restricts the tilt range of the subbase 26.

Figure 14:
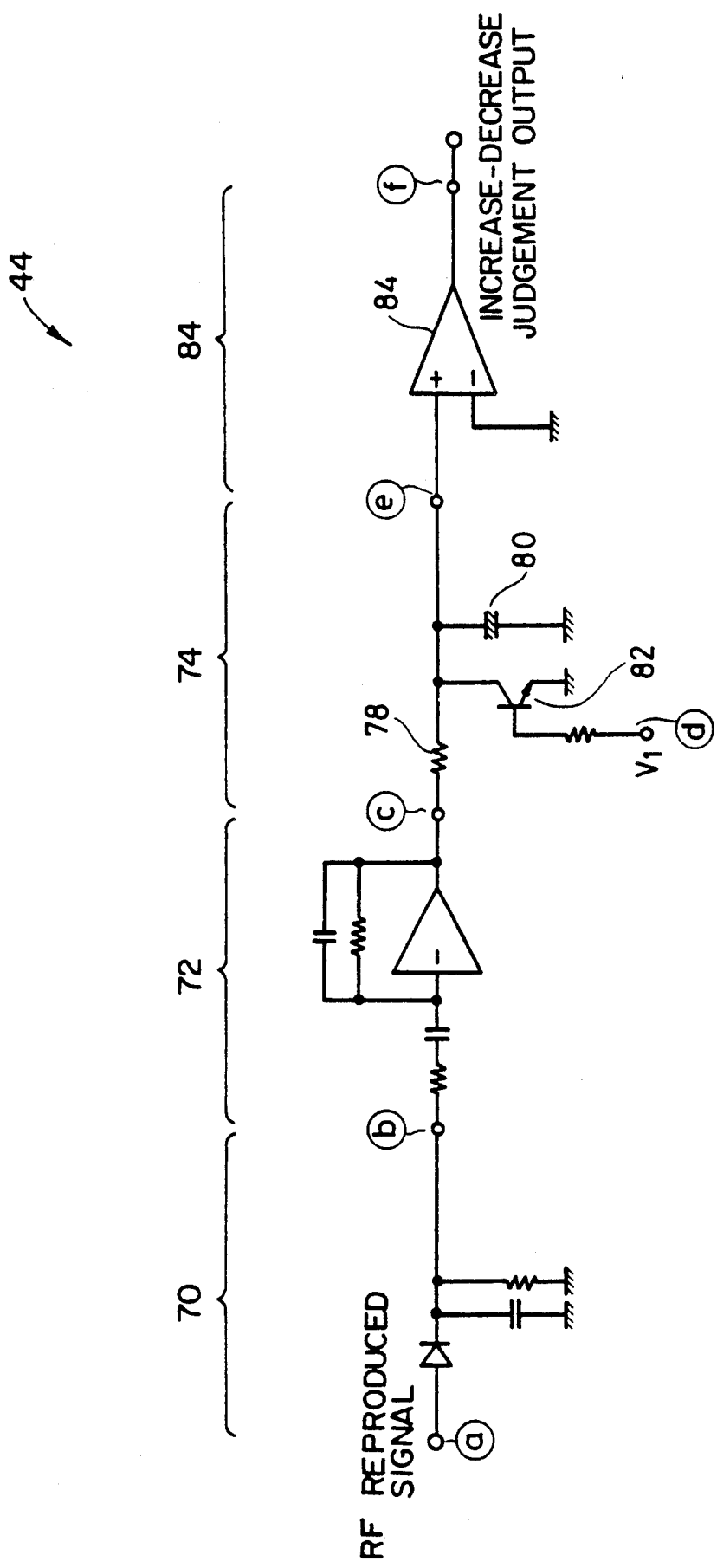
FIG. 14 is a circuit diagram of a specific example of an RF level increase-decrease judgement circuit.
Figure 15:
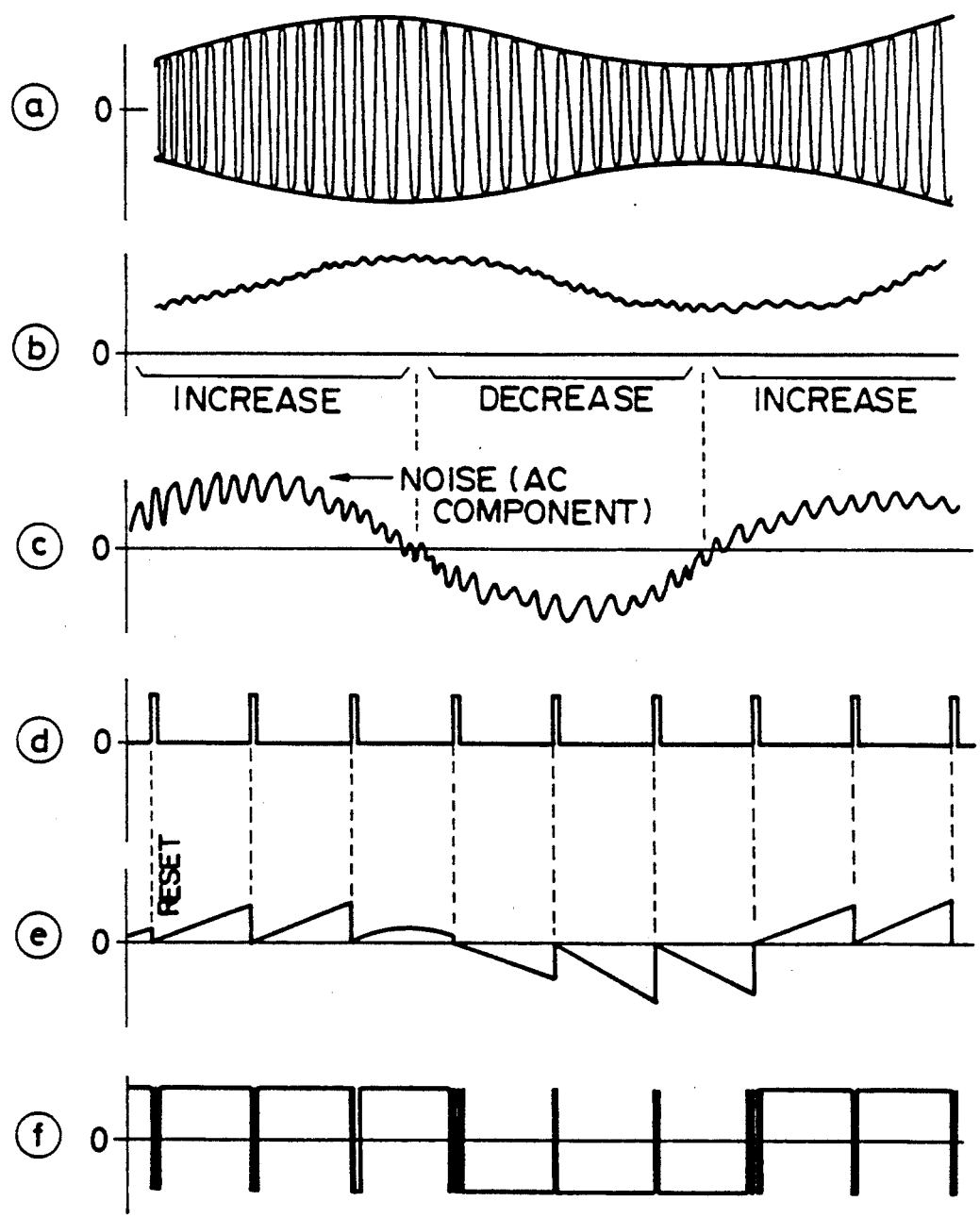
FIG. 15, consisting of (a)-(f), is a waveform diagram showing the operation of the circuit of FIG. 14.

A specific example of the RF level increase-decrease judgement circuit 44 is shown in FIG. 14. Waveforms of portions designated by ⓐ-ⓕ in the circuit of FIG. 14 are respectively shown in ⓐ-ⓕ of FIG. 15. In FIG. 14, an envelope ⓑ of RF level of the RF reproduced signal ⓐ is detected by a detection circuit 70. The detected envelope ⓑ is applied to a differential coefficient detection circuit 72. At the output of the differential coefficient detection circuit 72 is provided a signal ⓒ which, as shown in FIG. 15, has a polarity corresponding to increase or decrease of the RF reproduced signal and has an ac component superposed thereon. Since this signal contains much noise component (ac component), there is provided a preceding section averaging circuit 74 for removing this ac component. More specifically, the output ⓒ of the differential coefficient detection circuit 72 charges a capacitor 80 through a resistor 78. A transistor 82 is connected in parallel with the capacitor 80 and the transistor 82 is brought into conduction periodically by a signal V1 shown in ⓓ of FIG. 15 thereby discharging the capacitor 80. A saw-tooth wave as shown in ⓔ of FIG. 15 thereby is obtained from the capacitor 80. Each peak value of this saw-tooth wave constitutes an average value of the output ⓒ of the differential coefficient detection circuit 72 in the immediately preceding section.

Polarity of output of an increase-decrease judgement circuit (zero-cross comparator) 84 is inverted each time the output of the capacitor 80 shown in ⓔ of FIG. 15 zero-crosses. The comparator 84 produces a result as shown in ⓕ of FIG. 15 at each period of the signal V1.

Figure 16:
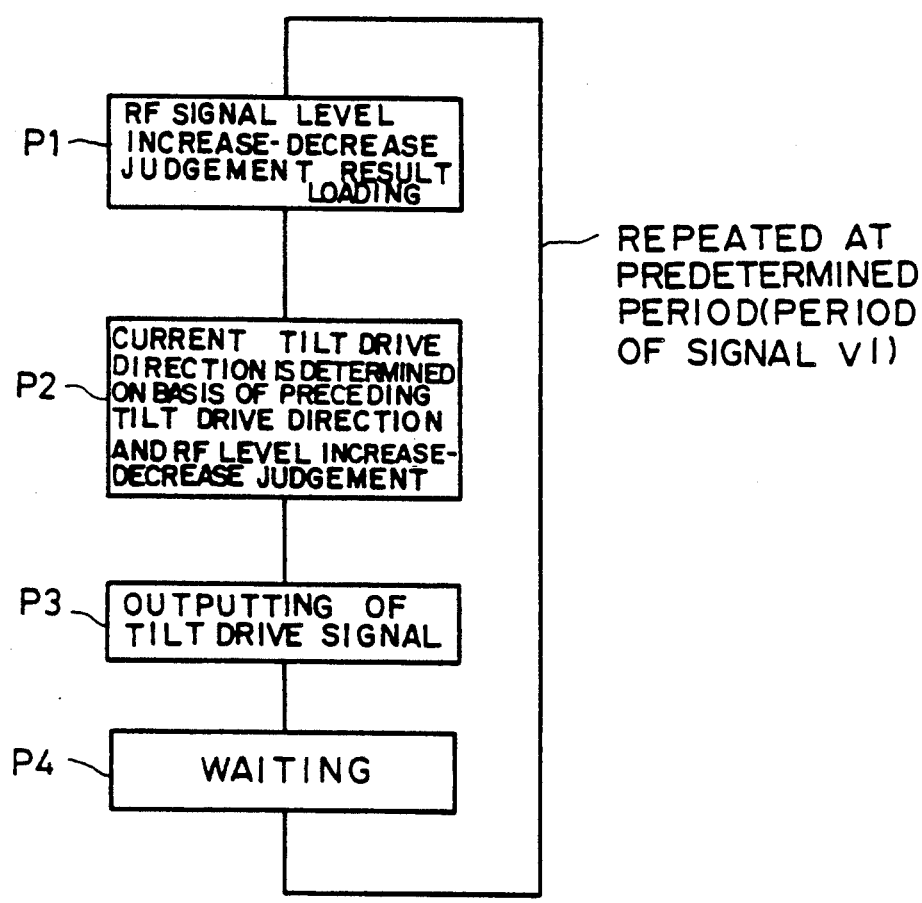
FIG. 16 is a flow chart showing the control of the circuit of FIG. 1.

An example of a control flow chart by the CPU 46 of FIG. 1 is shown in FIG. 16. When result of the increase-decrease judgement of the RF signal level has been obtained (P1), current tilt drive direction is determined depending upon the preceding tilt drive direction and the result of the increase-decrease judgement of the RF signal (P2). If the RF level has increased as a result of the preceding tilt drive, it means that the drive has been made in the direction in which the tilt error is decreased so that the tilt drive is made in the same direction. If the RF level has decreased as a result of the preceding tilt drive, it means that the drive has been made in the direction in which the tilt error is increased so that the tilt drive is made in the opposite direction.

A tilt drive signal is produced for a predetermined period of time in accordance with such determination (P3) to drive the tilt motor 50 and thereby tilt-controls the optical pickup 12.

The above described operation is repeated upon lapse of a predetermined period of waiting time after tilt drive. By this arrangement, the optical axis 1 is controlled so that it becomes always perpendicular to the disc surface.

Figure 17:
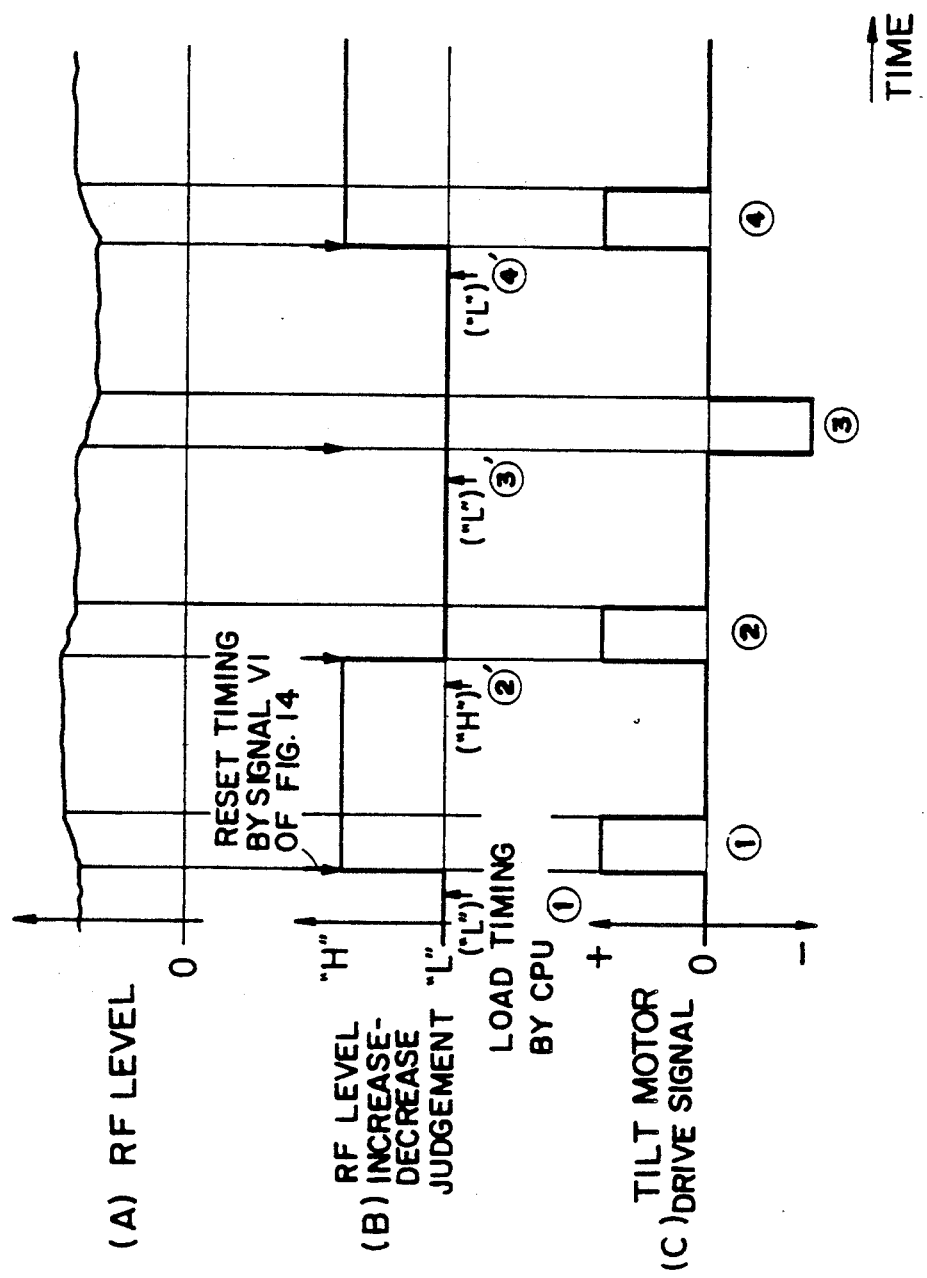
FIG. 17, consisting of (A) (B) (C), is a waveform diagram showing the operation of the circuit of FIG. 1.

Nextly, an example of operation of the circuit of FIG. 1 in case that the RF level increase-decrease judgement circuit 44 is constructed as shown in FIG. 14 is shown in FIG. 17. In FIG. 17, (A) through (C) show waveforms of the portions designated by (A) through (C) in FIG. 1. The RF level increase-decrease judgement is made with a period of the signal V1 of FIG. 14 and a signal "H" is produced when the level increases and "L" when the level decreases. The polarity (i.e., drive direction) of the tilt motor drive signal provided by the CPU 46 is determined depending upon the preceding tilt drive direction and the result of the current increase-decrease judgement of RF level. At ① of FIG. 17(C), the drive direction is inverted to the positive direction because it has been detected at the timing of ①' that the preceding drive in the negative direction has resulted in decrease in the RF level (i.e., increase in the tilt error). At ② of FIG. 17(C), the drive is still made in the positive direction because it has been detected at the timing of ②' that the drive in the positive direction at ① has resulted in increase in the RF level (i.e., decrease in the tilt error). At ③ of FIG. 17(C), the drive direction is inverted to the negative direction because it has been detected at the timing of ③' that the drive in the positive direction at ② has resulted in decrease in the RF level (the tilt error has zero-crossed). At ④ of FIG. 17(C), the drive direction is inverted to the positive direction because it has been detected at the timing of ④' that the negative direction at ③ has resulted in the decrease in the RF level (i.e., increase in the tilt error). In the foregoing manner, the tilt control is performed following warp on the disc to achieve tilt error zero.

In the above described embodiment, the tilt drive is performed by the tilt mechanism shown in FIGS. 12 and 13. This invention however is applicable to other types of tilt mechanisms.

The control for bringing the RF level to maximum or substantially maximum is not limited to the above described RF level increase-decrease judgement but any other method may be employed.

What is claimed is:

1. A tilt servo circuit for an optical disc reproducing device comprising:
   RF level detection means for detecting level of an RF reproduced signal from an optical pickup;
   tilt changing means for changing a tilt angle of the optical pickup; and
   tilt servo control means responsive to the output of the RF level detection means for controlling the tilt changing means so as to bring the RF level to maximum or substantially maximum.

2. A tilt servo circuit as defined in claim 1 wherein said RF level detection means comprises an RF level increase-decrease judgement circuit for judging increase or decrese in the RF level.

3. A tilt servo circuit as defined in claim 2 wherein said tilt servo control means inverts polarity of driving of said tilt changing means when said RF increase-decrease judgement circuit has judged decrease in the RF level.

* * * * *